United States Patent [19]

Higgins

[11] Patent Number: 4,620,855

[45] Date of Patent: Nov. 4, 1986

[54] AMINO SULFONIC ACID DERIVATIVES OF CARBOXYLIC ACID-CONTAINING INTERPOLYMERS, AND FUELS, LUBRICANTS AND AQUEOUS SYSTEMS CONTAINING SAID DERIVATIVES

[75] Inventor: William A. Higgins, Gates Mills, Ohio

[73] Assignee: The Lubrizol Corp., Wickliffe, Ohio

[21] Appl. No.: 669,175

[22] Filed: Nov. 7, 1984

[51] Int. Cl.$^4$ .......................... C08K 5/01; C10L 1/24; C10M 151/04

[52] U.S. Cl. ......................................... 44/62; 252/33; 252/33.3; 252/46.4; 524/484; 524/485; 524/491

[58] Field of Search ..................... 44/62; 252/33, 33.3, 252/46.4; 525/327.5, 329.5, 329.8, 351; 524/484, 485, 491

[56] References Cited

U.S. PATENT DOCUMENTS

| | | | |
|---|---|---|---|
| 3,039,870 | 6/1962 | Laakso et al. | 525/351 |
| 3,401,117 | 9/1968 | Schiff | 252/33 |
| 4,034,001 | 7/1971 | Miller et al. | 252/33 |
| 4,049,565 | 9/1977 | Nnadi et al. | 252/33 |
| 4,177,192 | 12/1979 | Heiba et al. | 252/33 |
| 4,284,517 | 8/1981 | Chen et al. | 525/351 |
| 4,317,893 | 3/1982 | Chen et al. | 525/351 |

FOREIGN PATENT DOCUMENTS 2241568 12/1975 France .
939250 10/1963 United Kingdom .

*Primary Examiner*—Veronica P. Hoke
*Attorney, Agent, or Firm*—Joseph P. Fischer; Denis A. Polyn; James L. Cordek

[57] ABSTRACT

N-acylated aminohydrocarbyl sulfonic acids or acid derivative compositions are described which are characterized by the presence with the structure of at least one acyl, acylimidoyl or acyloxy group attached to the amino nitrogen, said groups being derived from at least one of the carboxylic acid groups contained in an interpolymer of (i) at least one vinyl aromatic monomer and (ii) at least one alpha, beta-unsaturated acid or derivative thereof. Aqueous systems also are described which comprise at least about 40% of water and the N-acylated amino hydrocarbyl sulfonic acid or salt composition of the invention. The hydrocarbyl sulfonic acid or salt compositions of the present invention are useful as emulsifiers, thickeners, dispersants, etc. in the aqueous systems, and the compositions also are useful as additives in fuels and lubricants.

52 Claims, No Drawings

AMINO SULFONIC ACID DERIVATIVES OF CARBOXYLIC ACID-CONTAINING INTERPOLYMERS, AND FUELS, LUBRICANTS AND AQUEOUS SYSTEMS CONTAINING SAID DERIVATIVES

BACKGROUND OF THE INVENTION

This invention relates to N-acylated amino hydrocarbyl sulfonic acid and acid derivative compositions. Such compositions are useful in fuels, lubricants and aqueous systems particularly as emulsifiers, surface active agents and thickeners.

Derivatives of some N-acylated amino hydrocarbyl sulfonic acids have been described in the prior art. For example, U.S. Pat. No. 3,926,820 describes salts of alkyl or alkenyl succinimido aryl sulfonic acids having from about 14 to about 30 carbon atoms in the alkyl or alkenyl group. Such compounds are reported to be useful as thickeners in the preparation of greases. Products prepared by the reaction of maleic anhydride or substituted succinic anhydride with amino alkyl sulfonic acids are described in U.S. Pat. Nos. 3,991,079 and 3,932,288. Similar products also are described in British Patent Specification Nos. 1,377,077 and 1,377,948. Such products are described in these patents as being useful as additives for lubricants and fuel compositions. U.S. Pat. No. 3,188,307 describes alkenyl-N-sulfo-oxyhydrocarbon-imides which are reported to have detergent, wetting and surface active properties in aqueous systems. Such compounds are derived from alkenyl-substituted anhydrides and sulfated alkanol amines.

SUMMARY OF THE INVENTION

Novel N-acylated amino hydrocarbyl sulfonic acid and acid derivative compositions are provided in accordance with the present invention which are characterized by the presence within the structure of at least one acyl, acylimidoyl or acyloxy group attached to the amino nitrogen, said groups being derived from at least one of the carboxylic acid groups contained in an interpolymer of (i) at least one olefin monomer and (ii) at least one alpha, beta-unsaturated acid or derivative thereof. Such compositions are useful in fuels, lubricants and in aqueous systems where the compositions function as emulsifying agents and thickeners.

DESCRIPTION OF THE PREFERRED EMBODIMENTS

The novel N-acylated amino hydrocarbyl sulfonic acid or acid derivative compositions of the present invention are characterized by the presence within their structure of at least one acyl, acylimidoyl or acyloxy group attached directly to the amino nitrogen, said groups being derived from the carboxylic acid groups contained in an interpolymer of (i) at least one olefin monomer and (ii) at least one alpha, beta-unsaturated acid or derivative thereof. Such compositions are prepared by reacting the above-described interpolymers with at least one amino hydrocarbyl sulfonic acid of the formula

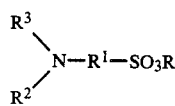 (I)

wherein R is hydrogen, a cation or an alkyl or substituted alkyl group, $R^1$ is a hydrocarbyl group of from 1 to about 30 carbon atoms, $R^2$ and $R^3$ are independently hydrogen atoms or a monovalent hydrocarbyl or substituted hyrocarbyl group containing from 1 to about 18 carbon atoms with the proviso that at least one of $R^2$ or $R^3$ is hydrogen. It will be apparent from the above description that the amino hydrocarbyl sulfonic acids used in this invention are characterized by the presence of a primary amine group ($-NH_2$) or a secondary amine group ($>NH$).

When the term "hydrocarbyl" is used in describing a substituent in this specification and the appended claims, it is intended to embrace substantially hydrocarbyl groups unless expressly stated to the contrary. "Substantially hydrocarbyl groups" are those hydrocarbyl groups which are substituted with non-hydrocarbyl substituents (such as those enumerated below) which do not significantly affect the hydrocarbyl character and nature of the group in the context of this invention. Such groups will be considered equivalent to hydrocarbyl groups by those skilled in the art to which this invention pertains.

Non-limiting examples of substituents that do not significantly alter the hydrocarbyl nature of the hydrocarbyl groups of this invention are the following:

pendant ether groups (especially hydrocarbyloxy and particularly alkoxy groups of up to ten carbon atoms)

Oxa linkages (e.g., $-O-$ linkages in a hydrocarbyl chain)

nitro cyano fluoro pendant thioether groups (espcially $C_{1-10}$ alkyl thioethers such as methyl mercapto, butylmercapto, etc.)

thia linkages (e.g., $-S-$ linkages in the main hydrocarbyl chain)

pendant sulfonyl groups ($-SO_2$) and sulfinyl linkages in the main chain pendant sulfinyl groups ($-SO-$) and sulfonyl linkages in the main chain.

Other such non-hydrocarbyl groups will be apparent to those skilled in the art.

When such non-hydrocarbyl substituents are present in the hydrocarbyl substituents of the present invention there will generally be no more than two such substituents for every 10 carbon atoms in each hydrocarbyl group and, preferably, no more than 1 for each 10 carbon atoms. Ordinarily, however, no such substituents will be present and the hydrocarbyl groups of the present invention be purely hydrocarbyl without non-hydrocarbyl substituents.

The group $R^1$ in Formula I can be aliphatic, alicyclic or aromatic in nature. Preferably $R^1$ is an aromatic or aliphatic hydrocarbyl group of about 2 to about 18 carbon atoms. For example, $R^1$ can be aromatic in nature such as a phenylene, methyl phenylene or biphenylene unit or aliphatic in nature such as methylene, propylene, trimethylene, ethylene, octamethylene, etc. It can also be alicyclic in nature such as cyclopentyl, cyclohexyl, methyl cyclohexyl, etc. Other groups which can be represented by $R^1$ in Formula I include the following:

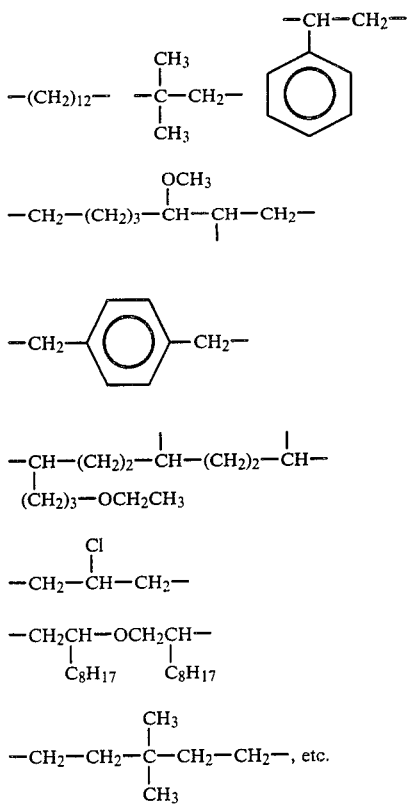

In a preferred embodiment, the amino sulfonic acids are characterized by the formula

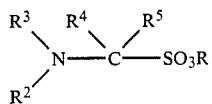
(II)

wherein R, $R^2$ and $R^3$ are as defined with respect to Formula I, and $R^4$ and $R^5$ are each independently hydrogen, alkyl groups or aromatic groups. Generally, $R^4$ is hydrogen, an alkyl group or an aromatic group, and $R^5$ is hydrogen.

As mentioned above, $R^2$ and $R^3$ are each independently hydrogen, or a monovalent hydrocarbyl or substantially hydrocarbyl group of about 1 to about 18 carbon atoms. Examples of suitable hydrocarbyl groups include alkyl groups, cycloalkyl groups, aryl groups, aralkyl groups, alkaryl, alkenyl, cycloalkenyl groups, etc. Generally, the hydrocarbyl groups will not contain more than 12 carbon atoms each. The hydrocarbyl groups also may be substantially hydrocarbyl in nature and contain one or more substituents such as halo, or alkoxy, lower alkyl mercapto, nitro, etc. Generally, however, each of $R^2$ or $R^3$ when it is other than hydrogen is an alkyl, pheny or lower alkyl-substituted phenyl group of about 1 to 12 carbon atoms. Specific examples of the $(R^2)(R^3)N$— group of Formulae I and II are amino (i.e., —$NH_2$), methylamino, ethylamino, octylamino, decylamino, cyclohexylamino, N-ethylcyclopentylamino, 3-chlorocyclohexylamino, aminoethylamino, beta-chloroethylamino, beta-ethoxypropylamino, isopropylamino, anilino paranitroanilino, ortho, meta- or para-anisidino, diphenylamino, allylamino, 2,4,5-trimethylanilino, etc.

The amino sulfonic acids of the type represented by Formula II are prepared by methods well known in the art. One method of synthesizing such compounds utilizes the reaction of an aldehyde or ketone with an alkali metal bisulfite followed by reaction with ammonia, ammonium hydroxide, or a primary or secondary amine which may be an aliphatic or aromatic amine. Generally, equimolar amounts of aldehyde or ketone and bisulfite are stirred together in water forming an aldehyde-bisulfite in situ, followed by the addition of equimolar amounts of amine. When an aldehyde is utilized in the reaction, then either $R^4$ or $R^5$ in Formula III is hydrogen. When ketones are utilized, neither $R^4$ or $R^5$ can be hydrogen.

Examples of aldehydes which can be utilized in the preparation of the amino sulfonic acids of Formula III include formaldehyde, acetaldehyde, propionaldehyde, benzaldehyde, parachlorobenzaldehyde, phenylacetaldehyde, phenylpropionaldehyde, etc. Examples of ketones include acetone, methylethylketone, diethylketone, benzophenone, etc. The amines which can be utilized in the preparation of the amino sulfonic acids are exemplified by methylamine, ethylamine, propylamine, butylamine, pentylamine, octylamine, decilamine, cyclohexylamine, aniline, paranitroaniline, parachloroaniline, etc.

In another embodiment, the amino sulfonic acids are aliphatic acids of the formula:

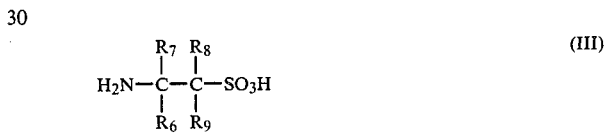
(III)

wherein $R_6$, $R_7$, $R_8$, and $R_9$ are each independently selected from the group consisting of hydrogen atoms and $C_1$ to $C_{18}$, more preferably $C_1$ to $C_{12}$, hydrocarbyl groups. In an especially preferred aspect of the invention, $R_6$, $R_7$, $R_8$, and $R_9$ are each independently hydrogen or lower alkyl (that is, alkyl of up to 7 carbon atoms) with the proviso that at least one is other than hydrogen. A useful method for preparing such 2-amino alkane sulfonic acids is by hydrolysis of the corresponding 2-amido alkane sulfonic acids. Thes amido compounds are conveniently prepared by reaction of a nitrile with an olefin in the presence of concentrated sulfuric acid. For further details, see U.S. Pat. Nos. 3,544,597 and 3,506,707; Canadian Pat. No. 704,778 and British Pat. No. 1,090,779 which are hereby incorporated by reference for their relevant disclosures in this regard.

As mentioned above, the R group in Formulae I and II is hydrogen, a cation, or an alkyl or substituted alkyl group. The cations preferably are cations of metals such as alkali or alkaline earth metals, ammonia, or amines.

Preferably, when M is a metal, it will be a cation of a Group I or II metal although it can represent other metals such as iron, nickel, or zinc. The Group II metal cations constitute a preferred class with calcium and barium being particularly preferred. When R is an amine cation, the identity of the amine is not particularly critical and any amine capable of forming an amine salt with sulfonic acid is contemplated. Generaly amines containing from 1 to about 8 carbon atoms are preferred. It will be obvious to those skilled in the art that when the cation is polyvalent, the normal salts will comprise one equivalent of acid for each equivalent of metal.

When R is an alkyl or substituted alkyl group, R can be derived from a mono- or polyhydric alcohol or a hydroxy-substituted aromatic hydrocarbon containing up to 40 aliphatic carbon atoms. Thus, the R group can be derived from a mono- or polyhydric alkanol, mono- or polyhydric phenol, mono- or polyhydric cyclic alkanol, or mono- or polyhydric naphthol. Typical alcohols and hydroxy-substituted aromatic compounds useful for preparing the esters are the mono- and polyhydric lower alkanols such as methanol, ethanol, isopropanol, butanol, glycerol, mannitol, pentaerythritol, sorbitol, etc.; alkylene glycols and polyalkylene glycols where the alkylene groups contain up to 8 carbon atoms and the corresponding monoalkyl and monoaryl ethers such as ehtylene glycol, propylene glycol, trimethylene glycol, hexamethylene glycol, diethylene glycol, triethylene glycol, monoethyl ether of diethylene glycol and monophenyl ether of triethylene glycol; cycloalkanols, such as cyclohexanol, cyclopentanol, 4-methoxycyclohexanol, 1,3-dihydroxycyclopentane, 4-(beta-hydroxyethyl)-cyclohexanol, etc.; amino alcohols, such as tri-(beta-hydroxyethyl)amine, di-(beta-hydroxypropyl)amine, 3-(N,N-diethylamino)propanol, etc.; phenol, p-aminophenol, p-hydroxyethyl phenol, 1,3-di-(hydroxy)-phenol, p-phenyl-phenol, 1,2-di-(hydroxy)-naphthalene and phenylethanol. Ordinarily, the ester group will be derived from a mono- or polyhydric lower alkanol, phenol, or alkyl-substituted phenol containing one to three alkyl groups.

Hydroxy-substituted alkyl groups also can be introduced as the R group by reaction of an amino sulfonic acid with an alkylene oxide. Examples of useful oxides include ethylene oxide, propylene oxide, etc. The amount of alkylene oxide reacted with the sulfonic acid may be an excess thereby resulting in hydroxy alkyl groups of increasing molecular weight.

The carboxy-containing interpolymers useful in preparing the novel compositions of the invention by reaction with the above-described aminosulfonic acids are copolymers, terpolymers, and other interpolymers of alpha, beta-unsaturated dicarboxylic acids or derivatives thereof, or mixtures of two or more of any of these, and one or more olefin monomers. The derivatives of the dicarboxylic acid are derivatives which are polymerizable with the monoolefinic compound, and as such, may be the esters and anhydrides of the acids.

Suitable alpha, beta-unsaturated dicarboxylic acids, anhydrides or lower alkyl esters thereof useful in the preparation of the interpolymers include those wherein a carbon-to-carbon double bond is an alpha, beta-position to at least one of the carboxy functions (e.g., itaconic acid, anhydride or lower esters thereof) and preferably, in an alpha, beta-position to both of the carboxy functions of the alpha, beta-dicarboxylic acid, anhydride or the lower alkyl ester thereof (e.g., maleic acid, anhydride or the lower alkyl ester thereof). Normally, the carboxy functions of these compounds will be separated by up to 4 carbon atoms, preferably 2 carbon atoms.

A class of preferred alpha, beta-unsaturated dicarboxylic acid, anhydrides or the lower alkyl esters thereof, includes those compounds corresponding to the formulae:

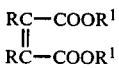 (IV)

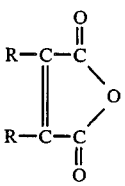 (V)

(including the geometric isomers thereof, i.e., cis and trans) wherein each R is independently hydrogen; halogen (e.g., chloro, bromo, or iodo); hydrocarbyl or halogen-substituted hydrocarbyl of up to about 8 carbon atoms, preferably alkyl, alkaryl or aryl; (preferably, at least one R is hydrogen); and each R' is independently hydrogen or lower alkyl of up to about 7 carbon atoms (e.g., methyl, ethyl, butyl or heptyl). These preferred alpha, beta-unsaturated dicarboxylic acids, anhydrides or alkyl esters thereof contain a total carbon content of up to about 25 carbon atoms, normally up to about 15 carbon atoms. Examples include maleic anhydride; benzyl maleic anhydride; chloro maleic anhydride; hetptyl maleate; citaconic anhydride; ethyl fumarate; fumaric acid; mesaconic acid; ethyl isopropyl maleate, isopropyl fumarate; hexyl methyl maleate; phenyl maleic anhydride and the like. These and other alpha, beta-unsaturated dicarboxylic compounds are well known in the art. Of these preferred alpha, beta-unsaturated dicarboxylic compounds, maleic anhydride, maleic acid and fumaric acid and the lower alkyl esters thereof are preferred. Interpolymers derived from mixtures of two or more of any of these can also be used.

Suitable olefins include ethylene, propylene, isobutene, styrene, para-t-butyl styrene, para-methyl styrene, etc. Vinyl aromatic monomers are preferred in the preparation of the interpolymers. Vinyl aromatic monomers of up to about 12 carbon atoms which can be polymerized with the alpha, beta-unsaturated dicarboxylic acids, anhydrides or lower esters thereof are well known. The nature of the vinyl aromatic monomer is normally not a critical or essential aspect of this invention as these compounds serve primarily as a connective moiety for the alpha, beta-unsaturated compounds in forming the interpolymers. The vinyl aromatic compounds include styrene and substituted styrenes such as alpha-halostyrenes, lower alkyl-substituted styrenes such as alpha-methyl-styrene, para-tert-butylstyrene, alpha-ethylstyrene, and para-lower alkoxy styrenes. Mixtures of two or more vinyl aromatic monomers can be used.

An important element of the present invention is the molecular weight of the carboxy-containing interpolymer. For convenience, the molecular weight is expressed in terms of the "reduced specific viscosity" of the interpolymer which is a widely recognized means of expressing the molecular size of a polymeric substance. As used herein, the reduced specific viscosity (abbreviated as RSV) is the value obtained in accordance with the formula $$RSV = \frac{\text{Relative Viscosity} - 1}{\text{Concentration}}$$

wherein the relative viscosity is determined by measuring, by means of a dilution viscometer, the viscosity of a solution of one gram of the interpolymer in 100 ml. of acetone and the viscosity of acetone at 30°±0.02° C. For purpose of computation by the above formula, the concentration is adjusted to 0.4 gram of the interpolymer per 100 ml. of acetone. A more detailed discussion of the reduced specific viscosity, also known as the specific viscosity, as well as its relationship to the average molecular weight of an interpolymer, appears in Paul J. Flory, Principles of Polymer Chemistry (1953 Edition) pages 308 et seq.

While interpolymers having a reduced specific viscosity of from about 0.05 to about 2 are contemplated in the present invention, the preferred interpolymers are those having a reduced specific viscosity of from about 0.3 to about 1. In most instances, interpolymers having a reduced specific viscosity of from about 0.5 to about 1 are particularly useful.

Mixtures of two or more compatible (i.e., nonreactive to one another) interpolymers which are separately prepared are contemplated herein for use in the reaction with the aminosulfonic acid, if each has a RSV as above described. Thus, as used herein, and in the appended claims, the terminology "interpolymer" refers to either one separately prepared interpolymer or a mixture of two or more of such interpolymers. A separately prepared interpolymer is one in which the reactants and/or reaction conditions are different from the preparation of another interpolymer.

Particularly preferred interpolymers useful in this invention are those of interpolymers made by reacting maleic acid, or anhydride or the lower esters thereof with styrene. Of these particularly preferred interpolymers those which are made of maleic anhydride and styrene and have a RSV in the range of about 0.3 to about 1.0 are especially useful. Of these latter preferred interpolymers, copolymers of maleic anhydride and styrene having a molar ratio of the maleic anhydride to styrene of about 1:1 are especially preferred. They can be prepared according to methods known in the art, as for example, free radical initiated (e.g., by benzoyl peroxide) solution polymerization. Examples of such suitable interpolymerization techniques are described in U.S. Pat. Nos. 2,938,016; 2,980,653; 3,085,994; 3,342,787; 3,418,292; 3,451,979; 3,536,461; 3,558,570; 3,702,300; and 3,723,375. These patents are incorporated herein by reference for their teaching of the preparation of suitable maleic anhydride and styrene containing interpolymers. Other preparative techniques are known in the art.

The molecular weight (i.e., RSV) of such interpolymers can be adjusted to the range required in this invention, if necessary, according to conventional techniques, e.g., control of the reaction conditions.

The following examples serve to illustrate the preparation of the interpolymers used in this invention and are not intended as limiting thereof. Unless otherwise indicated in these and the following examples, or in the specification, all parts and percentages are by weight, and temperatures are in degrees centigrade.

EXAMPLE A

A styrene-maleic interpolymer is obtained by reacting styrene (16.3 parts by weight) and maleic anhydride (12.9 parts) in a benzene-toluene solvent mixture (272.7 parts; weight ratio of benzene:toluene being 66.5:33.5) at 86° C. in a nitrogen atmosphere for 8 hours with a benzoyl peroxide (0.42 part) catalyst. The resulting product is a thick slurry of the interpolymer in the solvent mixture. To the slurry there is added mineral oil (141 parts) while the solvent mixture is being distilled off at 150° C. and then at 150° C. under a vacuum of 200 torr. A sample of the interpolymer isolated from the oil has a RSV of 0.69.

EXAMPLE B

An interpolymer is prepared by reacting (while maintaining the temperature between 99°-105° C.) styrene (536 parts) and maleic anhydride (505 parts) in toluene (7585 parts) in the presence of a catalyst solution prepared by dissolving benzoyl peroxide (1.5 parts) in toluene (50 parts). The toluene is removed by vacuum stripping as mineral oil (2228 parts) is added. The oil solution obtained in this manner contains 55.4% oil. The resulting interpolymer (free of oil) has a RSV of 0.42.

EXAMPLE C

The procedure of Example A is followed except that the interpolymer is prepared by reacting (while maintaining the temperature between 65°-106° C.) styrene (416 parts) and maleic anhydride (392 parts) in a benzene (2153 parts) and toluene (5025 parts) mixture in the presence of benzoyl peroxide (1.2 parts). The resulting interpolymer (free of oil) has a RSV of 0.45.

EXAMPLE D

The procedure of Example A is followed except that the interpolymer is obtained by reacting between 78°-92° C., styrene (416 parts) and maleic anhydride (392 parts) in a benzene (6101 parts) and toluene (2310 parts) mixture in the presence of benzoyl peroxide (1.2 parts). The resulting interpolymer (free of oil) has a RSV of 0.91.

EXAMPLE E

The procedure of Example A is followed except that the interpolymer is prepared by the following procedure: Maleic anhydride (392 parts) is dissolved in benzene (6870 parts). To this mixture at 76° C. is added first styrene, (416 parts) then benzoyl peroxide (1.2 parts). The mixture is maintained at 80°-82° C. for 5 hours. The resulting interpolymer (free of oil) has a RSV of 1.24.

EXAMPLE F

The procedure of Example E is followed except that acetone (1340 parts) is used in place of benzene as solvent and that azobis-isobutyronitrile (0.3 part) is used in place of benzoyl peroxide as catalyst.

EXAMPLE G

The procedure of Example A is followed except that the interpolymer is prepared as follows: To a solution of maleic anhydride (69 parts) in benzene (805 parts) at 50° C. there is added styrene (73 parts). The resulting mixture is heated to 83° C. and benzoyl peroxide (0.19 part) is added. The mixture is then maintained at 80°-85° C. The resulting interpolymer (free of oil) has a RSV of 1.64.

A convenient technique for preparing the N-acylated amino hydrocarbyl sulfonic acid or acid derivative compositions of the invention comprises reacting at least one carboxylic acid source comprising an interpolymer of (i) at least one olefin compound, and (ii) an alpha, beta-unsaturated carboxylic acid or derivative thereof,
with at least one amino sulfonic acid or functional derivative thereof such as a salt, ester, amide, halide, etc. (e.g., Formulae I, II and III). In such a reaction, the carboxylic acylating group —C(O)X of the carboxylic acid source wherein X is selected from the group consisting of halogen, hydroxy, hydrocarbyloxy and acyloxy groups reacts directly with the HN< or the H$_2$N— group of the amino sulfonic acid (i.e., Formula I) to form an acyl, acylimidoyl, acyloxy or imido group which links the carboxylic acid group directly to the sulfonic acid portion. The precise nature of the linkage is unimportant and generally, is believed that the linkage will be a mixture of the above-named linkages although it appears that in most instances, where polycarboxylic acids are utilized, and the nitrogen of the amino group contains two hydrogens, the imido group predominates. In some instances, the product appears to contain essentially all imido linkages. The proportions of the various types of linkages in the products obtained in accordance with the invention will depend in part on the particular carboxylic acid acylating reagent, the amino sulfonic acid involved, and the reaction temperature conditions such as reaction proportions, temperature, ratio of reactants, etc.

Usually this process is carried out by heating a mixture of at least one carboxylic acid or acid-producing acylating agent (preferably a polycarboxylic acid) and at least one amino sulfonic acid at a temperature above about 80° C. The maximum reaction temperature is the decomposition temperature of a reactant of product present in the mixture having the lowest decomposition temperature. Preferably the reaction temperature is within the range of about 100° to about 150° C. However, when a carboxylic acid or acid halide or anhydride is employed, the process can be carried out at lower temperatures such as about 30° C. to obtain products having predominantly salt or salt-amide linkages. Further heating of such salts or salt amides will produce products having predominantly amide, imide, or acylimidoyl linkages by heating them to 80° C. or higher. The use of solvents such as natural or synthetic lubricating oils, aromatic, aliphatic or alicyclic hydrocarbons and halogenated derivatives of such hydrocarbons as diluents is often desirable to facilitate temperature control and further processing such as filtration.

The relative proportions of the polycarboxylic acid acylating agent and the amino hydrocarbyl sulfonic acid compound used are such that at least one half of the stoichiometrically equivalent amount of the amino acid is used for each equivalent of acylating agent. In this regard, it should be noted that in the equivalent weight of the amino sulfonic acid compound is based on the number of non-acylated amino groups of the general formula HN< and H$_2$N— which it contains. Similarly the equivalent weight of the acylating agent is based on the number of acid or acid producing groups present. Thus, 2-amino-ethane sulfonic acid has one equivalent per mole. N-(2-aminoethyl)sulfanilic acid has two equivalents per mole. A substituted succinic acid anhydride or ester has two equivalents per mole and so forth. The upper limit of the useful amount of amino sulfonic acid compound appears to be four equivalents for each equivalent of carboxylic acid acylating agent. In most instances, the preferred amount of amino sulfonic acid compound is about one to about two equivalents of sulfonic acid compound for each equivalent of carboxylic acid acylating reagent.

In some instances it is desirable to react the product obtained from the reaction of an amino sulfonic acid and the carboxylic acid-containing interpolymer with a mono- or polyhydric compound, an amino or amino alcohol compound, or mixtures thereof to whereby any carboxy groups in the interpolymer which did not react with the amino sulfonic esters will react with the hydroxy or amino groups to form esters and amides respectively. Examples of mono- and polyhydric compounds which can be reacted include the lower alkanols such as methanol, ethanol, isopropanol, butanol, glycerol, mannitol, pentaerythritol, sorbitol, ethylene glycol, cyclohexanol, etc. The amines generally will be lower amines containing from 1 to about 8 carbon atoms and they may be primary or secondary amines. Examples of such amines include methyl amine, propyl amine, butyl amine, diethyl amine, etc. Hydroxy amines include ethanolamine, diethanolamine, etc. The amount of alkanol or amine reacted with the product obtained by reacting the interpolymer with the aminosulfonic acid can vary over a wide range and will depend in part on the number of unreacted carboxy groups available for reaction with the hydroxy- or amino-containing compounds.

The following examples illustrate the preparation of the N-acylated amino sulfonic acid compositions of the invention.

EXAMPLE 1

A mixture of 1100 parts of toluene, 137 parts of an interpolymer of styrene and maleic anhydride prepared in accordance with the procedure of Example A and having an RSV of 0.69 is prepared and heated to a temperature of about 100° C. whereupon 220 parts of the ammonium salt of amino methyl sulfonic acid are added dropwise over a period of 1.5 to 1.75 hours. During this addition, the temperature is maintained at between about 85° C. to about 95° C. After completion of the addition of the ammonium salt, the mixture is reflux until all of the water is removed, cooled to room temperature, and thereafter filtered and dried. The solid obtained in this manner is the desired product and contains 7.86% nitrogen (theory, 8.9%) and 8.81% sulfur (theory, 10.2%).

EXAMPLE 2

The procedure of Example 1 is repeated except that the maleic anhydride styrene interpolymer utilized in this example has an RSV of 0.42. The product obtained in this manner contains 7.60% nitrogen (theory, 8.9%) and 10.68% sulfur (theory, 10.2%).

EXAMPLE 3

The procedure of Example 1 is repeated except that the maleic anhydride styrene interpolymer utilized in this example has an RSV of 0.10. The product obtained in this manner contains 7.89% nitrogen (theory, 8.9%) and 9.55% sulfur (theory, 10.2%).

EXAMPLE 4

A mixture of 50 parts of an interpolymer of styrene and maleic anhydride prepared in accordance with the procedure of Example B and having an RSV of 0.42, 80 parts of the ammonium salt of amino methyl sulfonic acid and 600 parts of water is prepared in a reaction vessel fitted with stirrer, thermowell and cold water condenser. The mixture is heated to about 50° C. and thereafter heated more slowly to a temperature of about 100° C. The mixture is maintained at 100° C. for a total of about 10.5 hours. Filter aid is added and mixture is filtered. Filtrate is an aqueous solution of the desired product which, when isolated, is found to contain 8.09% nitrogen (theory 8.97%) and 9.04% sulfur (theory 10.2%).

EXAMPLE 5

A mixture of 90 parts of an interpolymer of styrene and maleic anhydride prepared in accordance with the general procedure of Example 1 except that the interpolymer has an RSV of 0.10, and 650 parts of water is prepared in a flask equipped with stirrer, thermowell and reflux condenser. The mixture is stirred at room temperature for about 1.5 hours, and after standing overnight, is heated to 62° C. in about 45 minutes. The mixture is cooled to 35° C. and 180 parts of a 33% aqueous solution of the sodium salt of amino methyl sulfonic acid are added dropwise over a period of about 1.6 hours as the reaction temperature is increased to about 51° C. After stirring for about 1 hour, the mixture is allowed to stand for 12 days at room temperature. The mixture then is heated to about 100° C. and maintained at this temperature for about 3 hours under reflux conditions. Thereafter, the mixture is heated to a temperature of 96°–100° C. while collecting about 306 parts of distillate which is mostly water. A filter aid is added to the reaction mixture which is then filtered. The filtrate is a light-yellow liquid aqueous solution of the desired product (84.6% water).

EXAMPLE 6

A mixture of 1100 parts of toluene and 137 parts (1 mole) of a styrene and maleic anhydride interpolymer having an MSV of 0.42 is prepared in a reaction vessel equipped with stirrer, thermowell and cold water condenser. The mixture is heated to reflux, and at a temperature of about 98° C., 110 parts of a 40% solution of the ammonium salt of amino methyl sulfonic acid in water is added dropwise over a period of about 45 minutes. The mixture is heated at the reflux temperature until all the water is removed, and the mixture then is cooled to room temperature. Methanol (10.9 parts, 0.5 moles) is added with mixing, and this mixture is heated to reflux for 3 hours. After cooling to room temperature, the reaction mixture is filtered. The product is dried and recovered. The product obtained in this manner contains 4.73% nitrogen (theory 5.1%) and 5.44% sulfur (theory 5.9%).

EXAMPLE 7

The procedure of Example 6 is repeated except that the methanol is replaced by 15.6 parts (0.5 mole) of anhydrous ethanol. The procedure prepared in this manner contains 4.44% nitrogen (theory 5.0%) and 8.32% sulfur (theory 5.7%).

EXAMPLE 8

The general procedure of Example 6 is repeated except that the methanol is replaced by 20.4 parts (0.5 mole) of N-propyl alcohol. The product obtained in this manner contains 4.8% nitrogen (theory 4.9%) and 6.2% sulfur (theory 5.6%).

EXAMPLE 9

The procedure of Example 6 is repeated except that the methanol is replaced by 25.8 parts (0.5 mole) of propylene glycol.

EXAMPLE 10

The ammonium salt prepared in Example 4 is converted to the sodium salt by reacting 309 parts of the product of Example 4 with 4.5 parts of sodium hydroxide with mixing. The product obtained in this manner contains 5.68% nitrogen, 8.75% sulfur and 6.52% sodium.

The N-acylated aminohydrocarbyl sulfonic acid and acid derivative compositions of the present invention are useful as additives in aqueous systems, fuels and lubricants. When incorporated into aqueous systems, the compositions of the present invention function as emulsifiers, thickeners, dispersants, etc. The amount of the composition of this invention incorporated into an aqueous system will be an amount which will be sufficient to perform the intended functions such as thickening, emulsifying, etc., and will be dependent generally upon the nature of the medium to which the composition is added.

The invention includes aqueous systems or compositions characterized by an aqueous phase with the amino sulfonic acids of the invention dispersed in said aqueous phase. Preferably, this aqueous phase is a continuous aqueous phase. These aqueous systems usually contain at least about 40% by weight water. Such aqueous systems encompass both concentrates containing about 40% to about 70%, preferably about 40% to about 65% water; and water-based functional fluids containing at least 40% and generally over 70% of water and a minor thickening or emulsifying amount of the amino sulfonic acids of the invention, preferably from about 1.5% to about 10%, more preferably about 3% to about 6% by weight of said amino sulfonic acids. The concentrates generally contain less than about 50%, preferably less than about 25%, more preferably less than about 15%, and still more preferably less than about 6% hydrocarbyl oil. The water-based functional fluids contain less than about 15%, preferably less than about 5%, and more preferably less than about 2% hydrocarbyl oil.

These concentrates and water-based aqueous systems can optionally include other conventional additives commonly employed in water-based functional fluids. These other additives include dispersant/solubilizers, surfactants, functional additives, corrosion-inhibitors, shear stabilizing agents, bactericides, dyes, water-softeners, odor masking agents, anti-foam agents, and the like.

The concentrates are analogous to the water-based functional fluids except that they contain less water and proportionately more of the other ingredients. The concentrates can be converted to water-based functional fluids by dilution with water. This dilution is usually done by standard mixing techniques. This is often a convenient procedure since the concentrate can be shipped to the point of use before additional water is added. Thus, the cost of a shipping a substantial amount of the water in the final water-based functional fluid is saved. Only the water necessary to formulate the concentrate (which is determined primarily by ease of handling and convenience factors), need be shipped.

Generally these water-based functional fluids are made by diluting the concentrates with water, wherein the ratio of water to concentrate is usually in the range of about 80:20 to about 99:1 by weight. As can be seen when dilution is carried out within these ranges, the final water-based functional fluid contains, at most, an insignificant amount of hydrocarbyl oil.

Also included within the invention are methods for preparing aqueous systems, including both concentrates and water-based functional fluids, containing other conventional additives commonly employed in water-based functional fluids. These methods comprise the steps of:
(1) mixing the composition of the invention with such other conventional additives either simultaneously or sequentially to form a dispersion or solution; optionally
(2) combining said dispersion or solution with water to form said aqueous concentrate; and/or
(3) diluting said dispersion or solution, or concentrate with water wherein the total amount of water used is in the amount required to provide the desired concentration of the composition of the invention and other functional additives in said concentrates or said water-based functional fluids.

These mixing steps are carried out using conventional equipment and generally at room or slightly elevated temperatures, usually below 100° C. and often below 50° C. As noted above, the concentrate can be formed and then shipped to the point of use where it is diluted with water to form the desired water-based functional fluid. In other instances the finished water-based functional fluid can be formed directly in the same equipment used to form the concentrate or the dispersion or solution.

The dispersant/solubilizers that are useful in accordance with the present invention include the nitrogen-containing, phosphorus-free carboxylic solubilizers disclosed in U.S. Pat. Nos. 4,329,249; 4,368,133; 4,435,297; 4,447,348; and 4,448,703. These patents are incorporated herein by reference. Briefly, these dispersant/solubilizers are made by reacting (I) at least one carboxylic acid acylating agent having at least one hydrocarbyl-based substituent of at least about 12 to about 500 carbon atoms with (II) at least one (a) N-(hydroxyl-substituted hydrocarbyl)amine, (b) hydroxyl-substituted poly(hydroxycarbyloxy) analog of said amine (a), or (c) mixtures of (a) and (b). Preferred acylating agents include the substituted succinic acids or anhydrides. Preferred amines include the primary, secondary and tertiary alkanol amines or mixtures thereof. These dispersant/solubilizers are preferably used at effective levels to disperse or dissolve the various additives, particularly the functional additives discussed below, in the concentrates and/or water-based functional fluids of the present invention. In a particularly preferred embodiment of the present invention, the dispersant/solubilizer is the reaction product of a polyisobutenyl-substituted succinic anhydride with a diethylenethanolamine or a mixture of diethylenethanolamine and ethanolamine.

The surfactants that are useful can be of the cationic, anionic, nonionic or amphoteric type. Many such surfactants of each type are known to the art. See, for example, McCutcheon's "Emulsifiers & Detergents", 1981, North American Edition, published by McCutcheon Division, MC Publishing Co., Glen Rock, N.J., U.S.A., which is hereby incorporated by reference for its disclosures in this regard.

Among the nonionic surfactant types are the alkylene oxide-treated products, such as ethylene oxide-treated phenols, alcohols, esters, amines and amides. Ethylene oxide/propylene oxide block copolymers are also useful nonionic surfactants. Glycerol esters and sugar esters are also known to be nonionic surfactants. A typical nonionic surfactant class useful with the present invention are the alkylene oxide-treated alkyl phenols such as the ethylene oxide alkyl phenol condensates sold by the Rohm & Haas Company. A specific example of these is Triton X-100 which contains an average of 9-10 ethylene oxide units per molecule, has an HLB value of about 13.5 and a molecular weight of about 628. Many other suitable nonionic surfactants are known; see, for example, the aforementioned McCutcheon's as well as the treatise "Non-Ionic Surfactants" edited by Martin J. Schick, M. Dekker Co., New York, 1967, which is hereby incorporated by reference for its disclosures in this regard.

As noted above, cationic, anionic and amphoteric surfactants can also be used. Generally, these are all hydrophilic surfactants. Anionic surfactants contain negatively charged polar groups while cationic surfactants contain positively charged polar groups. Amphoteric dispersants contain both types of polar groups in the same molecule. A general survey of useful surfactants is found in Kirk-Othmer Encyclopedia of Chemical Technology, Second Edition, Volume 19, page 507 et seq. (1969, John Wiley and Son, New York) and the aforementioned compilation published under the name of McCutcheon's. These references are both hereby incorporated by reference for their disclosures relating to cationic, amphoteric and anionic surfactants.

Among the useful anionic surfactant types are the widely known carboxylate soaps, organo sulfates, sulfonates, sulfocarboxylic acids and their salts, and phosphates. Useful cationic surfactants include nitrogen compounds such as amine oxides and the well-known quaternary ammonium salts. Amphoteric surfactants include amino acid-type materials and similar types. Various cationic, anionic and amphoteric dispersants are available from the industry, particularly from such companies as Rohm & Haas and Union Carbide Corporation, both of America. Further information about anionic and cationic surfactants also can be found in the texts "Anionic Surfactants", Parts II and III, edited by W. M. Linfield, published by Marcel Dekker, Inc., New York, 1976 and "Cationic Surfactants", edited by E. Jungermann, Marcel Dekker, Inc., New York, 1976. Both of these references are incorporated by reference for their disclosures in this regard.

These surfactants, when used, are generally employed in effective amounts to aid in the dispersal of the various additives, particularly the functional additives discussed below, in such systems.

The functional additives that can be used are typically oil-soluble, water-insoluble additives which funtion in conventional oil-based systems as E.P. agents, anti-wear agents, load-carrying agents, friction modifiers, lubricity agents, etc. They can also function as anti-slip agents, film formers and friction modifiers. As is well known, such additives can function in two or more of the above-mentioned ways; for example, E.P. agents often funtion as load-carrying agents.

The term "oil-soluble, water-insoluble functional additive" refers to a functional additive which is not soluble in water above a level of about 1 gram per 100 milliliters of water at 25°, but is soluble in mineral oil to the extent of at least 1 gram per liter at 25°.

These functional additives can also include certain solid lubricants such as graphite, molybdenum disulfide and polytetrafluoroethylene and related solid polymers.

These functional additives can also include frictional polymer formers. Briefly, these are potential polymer forming materials which are dispersed in a liquid carrier at low concentration and which polymerize at rubbing or contacting surfaces to form protective polymeric films on the surfaces. The polymerizations are believed to result from the heat generated by the rubbing and, possibly, from catalytic and/or chemical action of the freshly exposed surface. A specific example of such materials is dilinoleic acid and ethylene glycol combinations which can form a polyester frictional polymer film. These materials are known to the art and descriptions of them are found, for example, in the journal "Wear", Volume 26, pages 369-392, and West German Published Patent Application No. 2,339,065. These disclosures are hereby incorporated by reference for their discussions of frictional polymer formers.

Typically these functional additives are known metal or amine salts of organo sulfur, phosphorus, boron or carboxylic acids which are the same as or of the same type as used in oil-based fluids. Typically such salts are of carboxylic acids of 1 to 22 carbon atoms including both aromatic and aliphatic acids; sulfur acids such as alkyl and aromatic sulfonic acids and the like; phosphorus acids such as phosphoric acid, phosphorus acid, phosphinic acid, acid phosphate esters and analogous sulfur homologs such as the thiophosphoric and dithiophosphoric acid and related acid esters; boron acids include boric acid, acid borates and the like. Useful functional additives also include metal dithiocarbamates such as molybdenum and antimony dithiocarbamates; as well as dibutyl tin sulfide, tributyl tin oxide, phosphate and phosphites; borate amine salts, chlorinated waxes; trialkyl tin oxide, molybdenum phosphates, and chlorinated waxes.

Mainly such functional additives are known to the art. For example, descriptions of additives useful in conventional oil-based systems and in the aqueous systems of this invention are found in "Advances in Petroleum Chemistry and Refining", Volume 8, edited by John J. McKetta, Interscience Publishers, New York, 1963, pages 31-38 inclusive; Kirk-Othmer "Encyclopedia of Chemical Technology", Volume 12, Second Edition, Interscience Publishers, New York, 1967, page 575 et seq.; "Lubricant Additives" by M. W. Ranney, Noyes Data Corporation, Park Ridge, N.J., U.S.A., 1973; and "Lubricant Additives" by C. V. Smalheer and R. K. Smith, The Lezius-Hiles Co., Cleveland, Ohio, U.S.A. These references are hereby incorporated by reference for their disclosures of functional additives useful in the systems of this invention.

In certain of the typical aqueous systems of the invention, the functional additive is a sulfur or chloro-sulfur E.P. agent, known to be useful in oil-base systems. Such materials include chlorinated aliphatic hydrocarbons, such as chlorinated wax; organic sulfides and polysulfides, such as benzyldisulfide, bis-(chlorobenzyl)disulfide, dibutyl tetrasulfide, sulfurized sperm oil, sulfurized methyl ester of oleic acid, sulfurized alkylphenol, sulfurized dipentene, sulfurized terpene, and sulfurized Diels-Alder adducts; phosphosulfurized hydrocarbons, such as the reaction product of phosphorus sulfide with turpentine or methyl oleate; phosphorus esters such as the dihydrocarbon and trihydrocarbon phosphites, i.e., dibutyl phosphite, diheptyl phosphite, dicyclohexyl phosphite, pentylphenyl phosphite, dipentylphenyl phosphite, tridecyl phosphite, distearyl phosphite and polypropylene substituted phenol phosphite; metal thiocarbamates, such as zinc dioctyldithiocarbamate and barium heptylphenol dithiocarbamate; and Group II metal salts of phosphorodithioic acid, such as zinc dicyclohexyl phosphorodithioate, and the zinc salts of a phosphorodithioic acid.

The functional additive can also be a film former such as a synthetic or natural latex or emulsion thereof in water. Such latexes include natural rubber latexes and polystyrene butadienes synthetic latex.

The functional additive can also be an anti-chatter or anti-squawk agent. Examples of the former are the amide metal dithiophosphate combinations such as disclosed in West German Pat. No. 1,109,302; amine salt-azomethene combinations such as disclosed in British Patent Specification No. 893,977; or amine dithiophosphate such as disclosed in U.S. Pat. No. 3,002,014. Examples of anti-squawk agents are N-acyl-sarcosines and derivatives thereof such as disclosed in U.S. Pat. Nos. 3,156,652 and 3,156,653; sulfurized fatty acids and esters thereof such as disclosed in U.S. Pat. Nos. 2,913,415 and 2,982,734; and esters of dimerized fatty acids such as disclosed in U.S. Pat. No. 3,039,967. The above-cited patents are incorporated herein by reference for their disclosure as pertinent to anti-chatter and anti-squawk agents useful as a functional additive in the aqueous systems of the present invention.

Specific examples of functional additives useful in the aqueous systems of this invention include the following commercially available products.

TABLE I

| Functional Additive Tradename | Chemical Description | Supplier |
| --- | --- | --- |
| Anglamol 32 | Chlorosulfurized hydrocarbon | Lubrizol[1] |
| Anglamol 75 | Zinc dialkyl phosphate | Lubrizol[1] |
| Molyvan L | A thiaphosphomolybdate | Vanderbilt[2] |
| Lubrizol-5315 | Sulfurized cyclic carboxylate ester | Lubrizol[1] |
| Emcol TS 230 | Acid phosphate ester | Witco[3] |

[1]The Lubrizol Corporation, Wickliffe, Ohio, U.S.A.
[2]R. T. Vanderbilt Company, Inc., New York, N.Y., U.S.A.
[3]Witco Chemical Corp., Organics Division, Houston, Texas, U.S.A.

Mixtures of two or more of any of the afore-described functional additives can also be used.

Typically, a functionally effective amount of the functional additive is present in the aqueous systems of this invention. For example, if the functional additive is intended to serve primarily as a load-carrying agent, it is present in a load-carrying amount.

The aqueous systems of this invention often contain at least one inhibitor for corrosion of metals. These inhibitors can prevent corrosion of either ferrous or non-ferrous metals (e.g., copper, bronze, brass, titanium, aluminum and the like) or both. The inhibitor can be organic or inorganic in nature. Usually it is sufficiently soluble in water to provide a satisfactory inhibiting action though it can function as a corrosion-inhibitor without dissolving in water, it need not be water-soluble. Many suitable inorganic inhibitors useful in the aqueous systems of the present invention are known to those skilled in the art. Included are those described in "Protective Coatings for Metals" by Burns and Bradley, Reinhold Publishing Corporation, Second Edition, Chapter 13, pages 596–605. This disclosure relative to inhibitors are hereby incorporated by reference. Specific examples of useful inorganic inhibitors include alkali metal nitrites, sodium di- and tripolyphosphate, potassium and dipotassium phosphate, alkali metal borate and mixtures of the same. Many suitable organic inhibitors are known to those of skill in the art. Specific examples include hydrocarbyl amine and hydroxy-substituted hydrocarbyl amine neutralized acid compound, such as neutralized phosphates and hydrocarbyl phosphate esters, neutralized fatty acids (e.g., those having about 8 to about 22 carbon atoms), neutralized aromatic carboxylic acids (e.g., 4-tertiarybutyl benzoic acid), neutralized naphthenic acids and neutralized hydrocarbyl sulfonates. Mixed salt esters of alkylated succinimides are also useful. Particularly useful amines include the alkanol amines such as ethanol amine, diethanol amine. Mixtures of two or more of any of the afore-described corrosion-inhibitors can also be used. The corrosion-inhibitor is usually present in concentrations in which they are effective in inhibiting corrosion of metals with which the aqueous composition comes in contact.

Certain of the aqueous systems of the present invention (particularly those that are used in cutting or shaping of metal) can also contain at least one polyol with inverse solubility in water. Such polyols are those that become less soluble as the temperature of the water increases. They thus can function as surface lubricity agents during cutting or working operations since, as the liquid is heated as a result of friction between a metal workpiece and worktool, the polyol of inverse solubility "plates out" on the surface of the workpiece, thus improving its lubricity characteristics.

The aqueous systems of the present invention can also include at least one bacteriocide. Such bacteriocides are well known to those of skill in the art and specific examples can be found in the aforementioned McCutcheon publication "Functional Materials" under the heading "Antimicrobials" on pages 9–20 thereof. This disclosure is hereby incorporated by reference as it relates to suitable bacteriocides for use in the aqueous compositions or systems of this invention. Generally, these bacteriocides are water-soluble, at least to the extent to allow them to function as bacteriocides.

The aqueous systems of the present invention can also include such other materials as dyes, e.g., an acid green dye; water softeners, e.g., ethylene diamine tetraacetate sodium salt or nitrilo triacetic acid; odor masking agents, e.g., citronella, oil of lemon, and the like; and anti-foamants, such as the well-known silicone anti-foamant agents.

The aqueous systems of this invention may also include an anti-freeze additive where it is desired to use the composition at a low temperature. Materials such as ethylene glycol and analogous polyoxyalkylene glycols can be used as anti-freeze agents. Clearly, the amount used will depend on the degree of anti-freeze protection desired and will be known to those of ordinary skill in the art.

It should also be noted that many of the ingredients described above for use in making the aqueous systems of this invention are industrial products which exhibit or confer more than one property on such aqueous systems. Thus, a single ingredient can provide several functions thereby eliminating or reducing the need for some other additional ingredient. Thus, for example, an E.P. agent such as tributyl tin oxide can also function as a bacteriocide.

As mentioned, one of the primary uses of the compositions of the present invention is as thickeners in aqueous systems, and the effectiveness of the compositions as thickeners is dependent upon the nature of the composition as well as the pH of the aqueous system. Utility of the compositions of the present invention as thickeners in aqueous systems is demonstrated by preparing solutions of the composition in various concentrations in water, adjusting the pH of the aqueous system if desired, and thereafter measuring the viscosity. The viscosity of aqueous systems containing various amounts of the compositions of the invention are summarized in the following Table II.

TABLE II

| | | Viscosities of Aqueous Systems | | | | | |
|---|---|---|---|---|---|---|---|
| Product of Example | Concn. in H$_2$O | pH$^a$ | Brookfield Visc. | | pH$^b$ | Brookfield Visc. | |
| | | | 2 rpm | 20 rpm | | 2 rpm | 20 rpm |
| 1 | 1% | 5.3 | 7050 cps | 1400 cps | 9.1 | 3160 cps | 592 cps |
| | 2% | 5.0 | 34,500 | 6090 | 9.1 | 11,050 | 2280 |
| | 5% | 4.6 | 238,000 | 50,000 | 8.9 | 132,500 | 24,550 |
| 2 | 1% | 5.6 | 535 | 153 | 9.0 | 100 | 50 |
| | 2% | 4.7 | 5500 | 1162 | 9.0 | 900 | 260 |
| | 5% | 4.4 | 85,000 | 16,300 | 9.0 | 6120 | 1290 |
| 3 | 1% | 5.0 | 0 | 5 | 9.0 | 0 | 4 |
| | 2% | 4.8 | 0 | 6 | 9.0 | 0 | 5 |
| | 5% | 4.4 | 0 | 8 | 9.0 | 0 | 7 |
| 6 | 1% | 4.4 | 360 | 77 | 9.0 | 225 cps | 95 |
| | 2% | 4.3 | 1200 | 243 | 9.0 | 800 | 262 |
| | 5% | 4.2 | 3100 | 1048 | 9.0 | 7120 | 1736 |
| 7 | 1% | 4.2 | 725 | 123 | 9.0 | 9920 | 1728 |
| | 2% | 4.2 | 2775 | 470 | 8.9 | 33,500 | 5600 |
| | 5% | 4.0 | 8600 | 2175 | 8.9 | 710,000 | 118,800 |
| 8 | 1% | 4.3 | 405 | 75 | 9.0 | 12,800 | 2150 |
| | 2% | 4.3 | 2335 | 390 | 8.9 | 45,000 | 7400 |
| | 5% | 4.0 | 10,200 | 2375 | 9.0 | 672,000 | 118,000 |

$^a$pH of prep. in tap water.
$^b$pH adjusted to ~9 with NH$_4$OH.

As previously indicated, the N-acylated amino hydrocarbyl sulfonic acid compositions of this invention are useful as additives for lubricants in which they function primarily as oxidation inhibitors and extreme pressure and anti-wear agents. Lubricating oils containing the sulfurized compositions of the invention exhibit good compatibility with synthetic elastomers such as those used as sealants in automotive transmissions. Transmission fluid, for example, can affect the tensile strength, elongation, hardness and volume of synthetic rubbers. Compounds such as Buna-N, polyacrylates and silicones are used in transmission oil seals. Lubricating compositions and automatic transmission fluids containing the sulfurized compositions of the invention exhibit good nitrile seal compatibility. The sulfurized products of the invention which include at least one terpene compound exhibit improved oil-solubility when compared to sulfurized terpenes, and the presence of the terpene compound in the sulfurized mixture generally results in the production of sulfurized products characterized by having a lighter color than can be obtained from the sulfurization of olefins when terpenes are not present.

The sulfurized compositions of the invention can be effectively employed in a variety of lubricating compositions formulated for a variety of uses. These lubricating compositions are based on diverse oils of lubricating viscosity, including natural and synthetic lubricating oils and mixtures thereof. These lubricating compositions containing the subject additive concentrates are effective as crankcase lubricating oils for spark-ignited and compression-ignited internal combustion engines, including automobile and truck engines, two-cycle engines, aviation piston engines, marine and low-load diesel engines, and the like. Also, automatic transmission fluids, transaxle lubricants, gear lubricants, metal-working lubricants, hydraulic fluids, and other lubricating oil and grease compositions can benefit from the incorporation of the subject additive concentrates.

Natural oils include animal oils and vegetable oils (e.g., castor oil, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins (e.g., polybutylenes, polypropylenes, propyleneisobutylene copolymers, chlorinated polybutylenes, etc.); poly(1-hexenes), poly(1-octenes), poly(1-decenes), etc. and mixtures thereof; alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenols, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymer (e.g., methylpolyisopropylene glycol ether having an average molecular weight of about 1000, diphenyl ether of polyethylene glycol having a molecular weight of about 500–1000, diethyl ether of polypropylene glycol having a molecular weight of about 1000–1500, etc.) or mono- and polycarboxylic esters thereof, for example, the acetic acid esters, mixed $C_3$–$C_8$ fatty acid esters, or the $C_{13}$Oxo acid diester of tetraethylene glycol.

Another suitable class of synthetic lubricating oils that can be used comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-hexyl)silicate, tetra-(p-tert-butylphenyl)silicate, hexyl-(4-methyl-2-pentoxy)disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Unrefined, refined and rerefined oils, either natural or synthetic (as well as mixtures of two or more of any of these) of the type disclosed hereinabove can be used in the concentrates of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

Generally the lubricants of the present invention contain an amount of one or more of the sulfonic acid compositions of this invention sufficient to provide them with improved properties such as dispersancy. Normally the amount employed will be about 0.01% to about 20%, preferably about 0.1% to about 10% of the total weight of the lubricating composition. This amount is exclusive of solvent/diluent medium. In lubricating compositions operated under extremely adverse conditions, such as lubricating compositions for marine diesel engines, the compositions of this invention may be present in amounts of up to about 30% by weight, or more, of the total weight of the lubricating composition.

The invention also contemplates the use of other additives in combination with the sulfonic acid compositions of this invention. Such additives include, for example, detergents and dispersants of the ash-producing or ashless type, corrosion- and oxidation-inhibiting agents, pour point depressing agents, extreme pressure agents, antiwear agents, color stabilizers and anti-foam agents.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magensium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature of about 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline, phenylenediamine, phenothiazine, phenyl-beta-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°–200° C.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricant compositions of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Pat. No. 1,306,529 and in many U.S. Pat. Nos. including the following: 3,163,603; 3,184,474; 3,215,707; 3,219,666; 3,271,310; 3,272,746; 3,281,357; 3,306,908; 3,311,558; 3,316,177; 3,340,281; 3,341,542; 3,346,493; 3,351,552; 3,381,022; 3,399,141; 3,415,750; 3,433,744; 3,444,170; 3,448,048; 3,448,049; 3,451,933; 3,454,607; 3,467,668; 3,501,405; 3,522,179; 3,541,012; 3,543,678; 3,542,680; 3,567,637; 3,574,101; 3,576,743; 3,630,904; 3,632,510; 3,632,511; 3,697,428; 3,725,441; 4,234,435; U.S. Pat. No. Re. 26,433.

(2) Reaction products of relatively high molecular weight aliphatic or alicyclic halides with amines, preferably olyalkylene polyamines. These may be characterized as "amine dispersants" and examples thereof are described for example, in the following U.S. Pat. Nos. 3,275,554; 3,438,757; 3,454,555; 3,565,804.

(3) Reaction products of alkyl phenols in which the alkyl group contains at least about 30 carbon atoms with aldehydes (especially formaldehyde) and amines (especially polyalkylene polyamines), which may be characterized as "Mannich dispersants". The materials described in the following U.S. Pat. Nos. are illustrative: 2,459,112; 2,962,442; 2,984,550; 3,036,003; 3,442,808; 3,448,047; 3,454,497; 3,459,661; 3,591,598; 3,600,372; 3,634,515; 3,649,229; 3,166,516; 3,236,770; 3,355,270; 3,368,972; 3,413,347; 3,461,172; 3,493,520; 3,539,633; 3,558,743; 3,586,629; 3,697,574; 3,725,277; 3,725,480; 3,726,882; 3,980,569.

(4) Products obtained by post-treating the carboxylic, amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. Pat. Nos. 3,036,003; 3,087,936; 3,200,107; 3,216,936; 3,254,025; 3,256,185; 3,278,550; 3,280,234; 3,281,428; 3,282,955; 3,312,619; 3,366,569; 3,367,943; 3,373,111; 3,403,102; 3,442,808; 3,455,831; 3,455,832; 3,493,520; 3,502,677; 3,513,093; 3,533,945; 3,539,633; 3,573,010; 3,579,450; 3,591,598; 3,600,372; 3,639,242; 3,649,229; 3,649,659; 3,658,836; 3,697,574; 3,702,757; 3,703,536; 3,704,308; 3,708,442.

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. Pat. Nos. 3,329,658; 3,449,250; 3,519,565; 3,666,730; 3,687,849; 3,702,300. The above-noted patents are incorporated by reference herein for their disclosures of ashless dispersants.

Auxiliary extreme pressure agents and corrosion- and oxidation-inhibiting agents which may be included in the lubricants of the invention are exemplified by chlorinated aliphatic hydrocarbons such as chlorinated wax; organic sulfides and polysulfides such as benzyl disulfide, bis(chlorobenzyl)disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate, phosphorus esters including principally dihydrocarbon and trihydrocarbon phosphites such as dibutyl phosphite, diheptyl phosphite, dicyclohexyl phosphite, pentylphenyl phosphite, dipentylphenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(hepthylphenyl)phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

Many of the above-mentioned auxiliary extreme pressure agents and corrosion-oxidation inhibitors also serve as antiwear agents. Zinc dialkylphosphorodithioates are a well known example.

Pour point depressants are a particularly useful type of additive often included in the lubricating oils described herein. The use of such pour point depressants in oil-based compositions to improve low temperature properties of oil-based compositions is well known in the art. See, for example, page 8 of "Lubricant Additives" by C. V. Smalheer and R. Kennedy Smith (Lezius-Hiles Co. publishers, Cleveland, Ohio, 1967).

Examples of useful pour point depressants are polymethacrylates; polyacrylates; polyacrylamides; condensation products of haloparaffin waxes and aromatic compounds; vinyl carboxylate polymers; and terpolymers of dialkylfumarates, vinyl esters of fatty acids and alkyl vinyl ethers. Pour point depressants useful for the purposes of this invention, techniques for their preparation and their uses are described in U.S. Pat. Nos. 2,387,501; 2,015,748; 2,655,479; 1,815,022; 2,191,498; 2,666,746; 2,721,877; 2,721,878; and 3,250,715 which are hereby incorporated by reference for their relevant disclosures.

Anti-foam agents are used to reduce or prevent the formation of stable foam. Typical anti-foam agents include silicones or organic polymers. Additional anti-foam compositions are described in "Foam Control Agents", by Henty T. Kerner (Noyes Data Corporation, 1976), pages 125–162.

The sulfonic acid compositions of this invention can be added directly to the lubricant to be treated. Preferably, however, they are diluted with a substantially inert, normally liquid organic diluent such as mineral oil, naphtha, benzene, toluene or xylene, to form an additive concentrate. These concentrates usually contain from about 20% to about 90% by weight of the sulfonic acid compositions of this invention and may contain, in addition, one or more other additives known in the art or described hereinabove. The remainder of the concentrate is the substantially inert normally liquid diluent.

The fuel compositions of the present invention contain a major proportion of a normally liquid fuel, usually a hydrocarbonaceous petroleum distillate fuel such as motor gasoline as defined by ASTM Specification D439 and diesel fuel or fuel oil as defined by ASTM Specification D396. Normally liquid fuel compositions comprising non-hydrocarbonaceous materials such as alcohols, ethers, organo-nitro compounds and the like (e.g., methanol, ethanol, diethyl ether, methyl ethyl ether, nitromethane) are also within the scope of this invention as are liquid fuels derived from vegetable or mineral sources such as corn, alfalfa, shale and coal. Normally liquid fuels which are mixtures of one or more hydrocarbonaceous fuels and one or more non-hydrocarbonaceous materials are also contemplated. Examples of such mixtures are combinations of gasoline and ethanol and of diesel fuel and ether. Particularly preferred is gasoline, that is, a mixture of hydrocarbons having an ASTM distillation range from about 60° C. at the 10% distillation point to about 205° C. at the 90% distillation point.

Generally, these fuel compositions contain a property improving amount of the sulfonic acid compositions of this invention; usually this amount is about 1 to about 50,000 parts by weight, preferably about 4 to about 5000 parts, of the composition of this invention per million parts of fuel.

The fuel compositions can contain, in addition to the composition of this invention, other additives which are well known to those of skill in the art. These include antiknock agents such as tetraalkyl lead compounds, lead scavengers such as haloalkanes (e.g., ethylene dichloride and ethylene dibromide), deposit preventers or modifiers such as triaryl phosphates, dyes, cetane improvers, antioxidants such as 2,6-di-tertiary-butyl-4-methylphenol, rust inhibitors such as alkylated succinic acids and anhydrides, bacteriostatic agents, gum inhibitors, metal deactivators, demulsifiers, upper cylinder lubricants and anti-icing agents.

In certain preferred fuel compositions the compositions of this invention are combined with an ashless dispersant in gasoline. Suitable ashless dispersants include esters of mono- or polyols and high molecular weight mono- or polycarboxylic acid acylating agents containing at least 30 carbon atoms in the acyl moiety. Such esters are well known to those skilled in the art. See, for example, French Pat. No. 1,396,645; British Pat. Nos. 981,850; 1,055,337 and 1,306,529; and U.S. Pat. Nos. 3,255,108; 3,311,558; 3,331,776; 3,346,354; 3,522,179; 3,579,450; 3,542,680; 3,381,022; 3,639,242; 3,697,428; and 3,708,522. These patents are expressly incorporated herein by reference for their disclosure of suitable esters and methods for their preparation. Generally, the weight ratio of the composition of this invention to the aforesaid ashless dispersant is between about 0.1:1 and about 10:1, preferably between about 1:1 and about 10:1.

The sulfonic acid compositions of this invention can be added directly to the fuel, or they can be diluted with a substantially inert, normally liquid organic diluent such as naphtha, benzene, toluene, xylene or a normally liquid fuel as described above, to form an additive concentrate. These concentrates generally contain from about 20% to about 90% by weight of the composition of this invention and may contain, in addition one or more other conventional additives known in the art or described hereinabove.

I claim:

1. An additive concentrate for preparing lubricants or normally liquid hydrocarbon fuel compositions comprising a substantially inert, normally liquid organic diluent selected from the group consisting essentially of naphtha, benzene, toluene, xylene, mineral oil and normally liquid fuels and from about 20 to about 90% by weight of an N-acylated amino hydrocarbyl sulfonic acid or acid derivative composition characterized by the presence within the structure of at least one acyl, acylimidoyl or acyloxy group attached to the amino nitrogen, said groups being derived from the carboxylic acid groups contained in an interpolymer of (i) at least one olefin monomer and (ii) at least one alpha, beta-unsaturated acid or derivative thereof.

2. The composition of claim 1 wherein the amino hydrocarbyl sulfonic acid portion is characterized by the partial formula

  (Ia)

wherein $R^1$ is a hydrocarbyl group of from 1 to about 30 carbon atoms and R is hydrogen, a cation or an alkyl or substituted alkyl group.

3. The composition of claim 2 wherein R' is an aliphatic, cycloaliphatic or aromatic group.

4. The composition of claim 2 wherein R' is an alkylene group containing from 1 to 18 carbon atoms.

5. The composition of claim 1 wherein the olefin is a vinyl aromatic monomer.

6. The composition of claim 5 wherein the vinyl aromatic monomer contains up to about 12 carbon atoms.

7. The composition of claim 1 wherein (ii) is maleic acid, fumaric acid, a lower alkyl ester of one of these acids, maleic anhydride or mixtures thereof.

8. The composition of claim 7 wherein (ii) is maleic acid or maleic anhydride.

9. The composition of claim 2 wherein the sulfonic acid is characterized by the partial formula

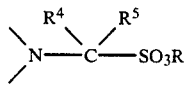
(IIa)

wherein R⁴ and R⁵ are each independently, hydrogen, alkyl groups or aromatic groups, and R is hydrogen or a cation of an alkali or alkaline earth metal, ammonia or an amine.

10. The composition of claim 9 wherein R⁴ is hydrogen, an alkyl group or an aromatic group and R⁵ is hydrogen.

11. The composition of claim 2 wherein R¹ is a phenylene group.

12. The composition of claim 2 wherein the cation R is a cation of a metal, ammonia or an amine.

13. The composition of claim 12 wherein the cation R is an alkali metal or ammonia.

14. The composition of claim 1 wherein the molar ratio of olefin monomer to unsaturated acid or anhydride in the interpolymer is from about 3:1 to about 1:10.

15. The composition of claim 1 also containing one or more ester or amide groups or mixtures of said groups derived from the carboxylic acid groups contained in the interpolymers.

16. An additive concentrate for preparing lubricants or normally liquid hydrocarbon fuel compositions comprising a substantially inert, normally liquid organic diluent selected from the group consisting essentially of naphtha, benzene, toluene, xylene, mineral oil and normally liquid fuels and from about 20 to about 90% by weight of an N-acylated amino alkylene sulfonic acid or salt composition characterized by the presence within its structure of at least one acyl, acylimidoyl or acyloxy group attached to the amino nitrogen, said groups being derived from a carboxy containing interpolymer of (i) a vinyl aromatic monomer and (ii) at least one alpha, beta unsaturated acid, anhydride or derivative thereof.

17. The composition of claim 16 wherein (i) is a styrene.

18. The composition of claim 16 wherein the unsaturated acid or derivative is maleic acid or maleic anhydride.

19. The composition of claim 16 wherein the molar ratio of (i) to (ii) is from 3:1 to about 1:3.

20. The composition of claim 19 wherein the molar ratio is about 1:1.

21. The composition of claim 16 wherein the interpolymer has an RSV within the range of from about 0.05 to about 2.0.

22. The composition of claim 16 wherein the amino alkylene sulfonic acid or salt portion is characterized by the partial formula

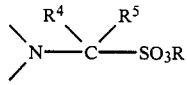
(IIa)

wherein
R⁴ is hydrogen, an alkyl group or an aromatic group,
R⁵ is hydrogen or a methyl group, and
R is hydrogen or a cation of an alkali or alkaline earth metal, ammonia or an amine.

23. The composition of claim 22 wherein R⁵ is hydrogen.

24. The composition of claim 23 wherein R⁴ is hydrogen.

25. The composition of claim 22 wherein R is an alkali metal or ammonium ion.

26. The composition of claim 16 also containing one or more ester or amide groups derived from the carboxylic acid groups contained in the interpolymer.

27. A lubricant or normally liquid hydrocarbon fuel composition containing a major amount of a lubricating oil or normally liquid hydrocarbon fuel and an amount up to about 30% by weight of lubricant or 1 to 50,000 parts by weight per million parts by weight of fuel of at least one N-acylated amino hydrocarbyl sulfonic acid or acid derivative composition characterized by the presence within the structure of at least one acyl, acylimidoyl or acyloxy group attached to the amino nitrogen, said groups being derived from the carboxylic acid groups contained in an interpolymer of (i) at least one olefin monomer and (ii) at least one alpha, beta-unsaturated acid or derivative thereof.

28. The lubricant or fuel composition of claim 27 wherein the amino hydrocarbyl sulfonic acid portion is characterized by the partial formula $$>N-R'-SO_3R \qquad (Ia)$$

wherein R′ is a hydrocarbyl group of from 1 to about 30 carbon atoms and R is hydrogen, a cation or an alkyl or substituted alkyl group.

29. The composition of claim 28 wherein R′ is an aliphatic, cycloaliphatic or aromatic group.

30. The composition of claim 28 wherein R′ is an alkylene group containing from 1 to 18 carbon atoms.

31. The lubricant or fuel composition of claim 27 wherein the olefin is a vinyl aromatic monomer.

32. The composition of claim 31 wherein the vinyl aromatic monomer contains up to about 12 carbon atoms.

33. The lubricant or fuel composition of claim 27 wherein (ii) is maleic acid, fumaric acid, a lower alkyl ester of one of these acids, maleic anhydride or mixtures thereof.

34. The composition of claim 33 wherein (ii) is maleic acid or maleic anhydride.

35. The composition of claim 28 wherein the sulfonic acid is characterized by the partial formula

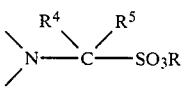
(IIa)

wherein R⁴ and R⁵ are each independently, hydrogen, alkyl groups or aromatic groups, and R is hydrogen or a cation of an alkali or alkaline earth metal, ammonia or an amine.

36. The composition of claim 35 wherein R⁴ is hydrogen, an alkyl group or an aromatic group and R⁵ is hydrogen.

37. The composition of claim 28 wherein R¹ is a phenylene group.

38. The composition of claim 28 wherein the cation R is a cation of a metal, ammonia or an amine.

39. The composition of claim 38 wherein the cation R is an alkali metal or ammonia.

40. The lubricant or fuel composition of claim 27 wherein the molar ratio of olefin monomer to unsaturated acid or anhydride in the interpolymer is from about 3:1 to about 1:10.

41. The lubricant or fuel composition of claim 27 also containing one or more ester or amide groups or mixtures of said groups derived from the carboxylic acid groups contained in the interpolymers.

42. A lubricant or normally liquid hydrocarbon fuel composition containing a major amount of a lubricating oil or normally liquid hydrocarbon fuel and an amount up to about 30% by weight of lubricant or 1 to 50,000 parts by weight per million parts by weight of fuel of at least one N-acylated amino alkylene sulfonic acid or salt composition characterized by the presence within its structure of at least one acyl, acylimidoyl or acyloxy group attached to the amino nitrogen, said groups being derived from a carboxy containing interpolymer of (i) a vinyl aromatic monomer and (ii) at least one alpha, beta-unsaturated acid, anhydride or derivative thereof.

43. The composition of claim 42 wherein (i) is a styrene.

44. The composition of claim 42 wherein the unsaturated acid or derivative is maleic acid or maleic anhydride.

45. The composition of claim 42 wherein the molar ratio of (i) to (ii) is from 3:1 to about 1:3.

46. The composition of claim 45 wherein the molar ratio is about 1:1.

47. The composition of claim 42 wherein the interpolymer has an RSV within the range of from about 0.05 to about 2.0.

48. The composition of claim 42 wherein the amino alkylene sulfonic acid or salt portion is characterized by the partial formula

 (IIa)

wherein
$R^4$ is hydrogen, an alkyl group or an aromatic group,
$R^5$ is hydrogen or a methyl group, and
R is hydrogen or a cation of an alkali or alkaline earth metal, ammonia or an amine.

49. The composition of claim 48 wherein $R^5$ is hydrogen.

50. The composition of claim 49 wherein $R^4$ is hydrogen.

51. The composition of claim 48 wherein R is an alkali metal or ammonium ion.

52. The composition of claim 42 also containing one or more ester or amide groups derived from the carboxylic acid groups contained in the interpolymer.

* * * * *